(12) United States Patent
Bloukos et al.

(10) Patent No.: US 8,847,747 B2
(45) Date of Patent: Sep. 30, 2014

(54) VEHICULAR CHILD ALERT DEVICE

(76) Inventors: George T. Bloukos, The Villages, FL (US); Richard J. Zachar, Stuart, FL (US)

( * ) Notice: Subject to any disclaimer, the term of this patent is extended or adjusted under 35 U.S.C. 154(b) by 0 days.

(21) Appl. No.: 13/618,341

(22) Filed: Sep. 14, 2012

(65) Prior Publication Data

US 2014/0077943 A1  Mar. 20, 2014

(51) Int. Cl.
*B60Q 1/00* (2006.01)
*B60Q 5/00* (2006.01)
*B60Q 9/00* (2006.01)
*G08B 13/08* (2006.01)

(52) U.S. Cl.
CPC . *B60Q 5/001* (2013.01); *B60Q 9/00* (2013.01)
USPC ............ 340/457; 340/452.5; 340/545.8

(58) Field of Classification Search
USPC .................... 340/457, 425.5, 545.8
See application file for complete search history.

(56) References Cited

U.S. PATENT DOCUMENTS

| | | | |
|---|---|---|---|
| 5,121,098 A * | 6/1992 | Chen | 340/457 |
| 6,812,844 B1 * | 11/2004 | Burgess | 340/573.1 |
| 6,819,249 B1 * | 11/2004 | Papp | 340/573.1 |
| 6,870,472 B2 * | 3/2005 | Gift et al. | 340/457 |
| 7,388,537 B2 * | 6/2008 | Martinson et al. | 342/20 |
| 7,439,863 B2 * | 10/2008 | Suzuki et al. | 340/572.7 |
| 7,786,852 B2 * | 8/2010 | Kautz | 340/457 |
| 7,877,209 B2 * | 1/2011 | Harris et al. | 701/301 |
| 7,994,906 B2 * | 8/2011 | Salazar | 340/457 |
| 8,063,788 B1 * | 11/2011 | Morningstar | 340/667 |
| 8,520,069 B2 * | 8/2013 | Haler | 348/148 |
| 2004/0258404 A1 * | 12/2004 | Brown | 396/427 |
| 2006/0103525 A1 * | 5/2006 | Alger | 340/545.8 |
| 2009/0040036 A1 * | 2/2009 | Talis | 340/457.1 |
| 2010/0225455 A1 * | 9/2010 | Claiborne et al. | 340/384.7 |
| 2013/0278081 A1 * | 10/2013 | Chien | 307/121 |

* cited by examiner

*Primary Examiner* — Jennifer Mehmood
*Assistant Examiner* — Omar Casillashernandez
(74) *Attorney, Agent, or Firm* — Jason T. Daniel, Esq.; Daniel Law Offices, P.A.

(57) ABSTRACT

A vehicular child alert device includes a main body housing a pressure switch configured to indicate the status of a vehicle door, a memory configured to store audible notifications, a speaker configured to play the audible notifications, and a processor configured to control the device.

9 Claims, 4 Drawing Sheets

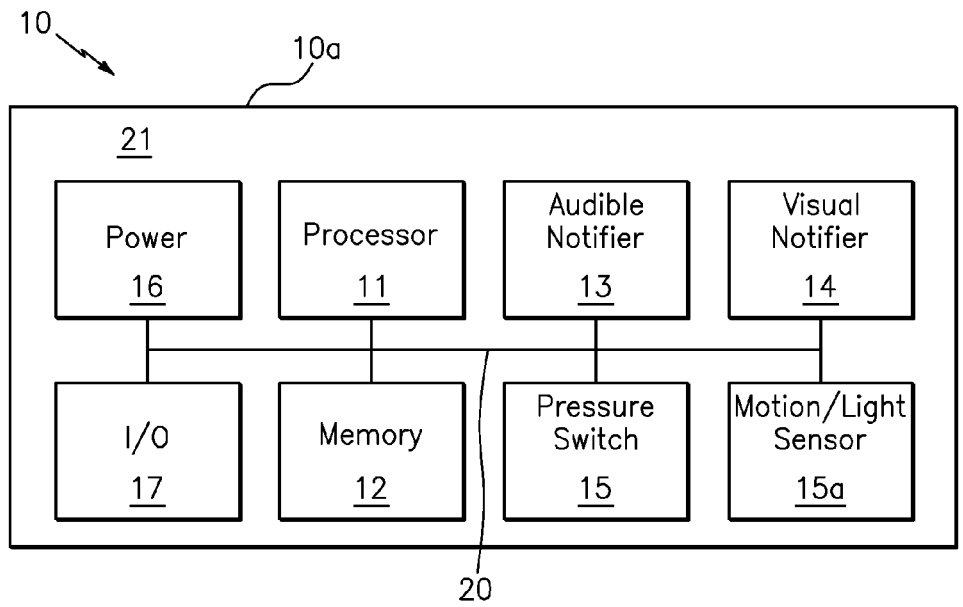
FIG. 1
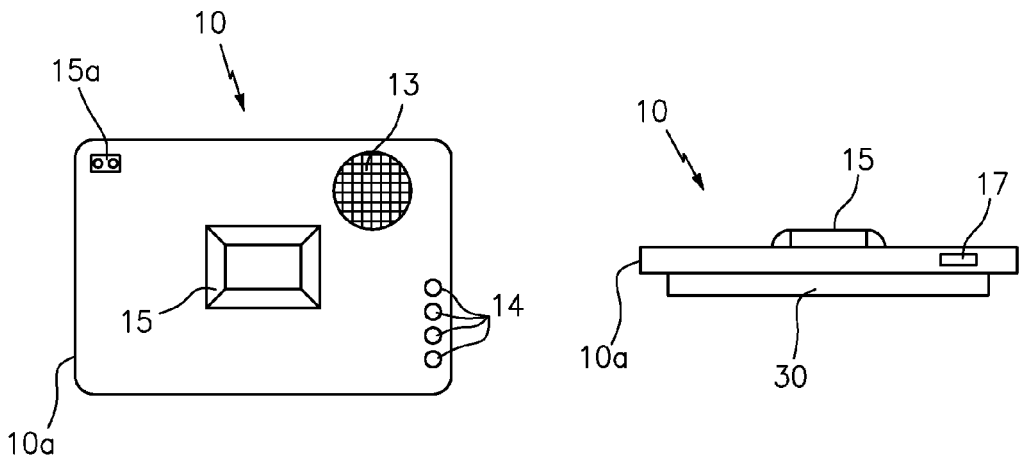
FIG. 2
FIG. 3

VEHICULAR CHILD ALERT DEVICE

TECHNICAL FIELD

The present invention relates generally to child safety products, and more particularly to a child alert device that reminds vehicle occupants to look for children before exiting the vehicle.

BACKGROUND

The statements in this section merely provide background information related to the present disclosure and may not constitute prior art.

As any parent will attest, the safety of their children is of paramount concern at all times. This is especially true with regard to young children and babies who are unable to take care of themselves for even the most basic of needs.

Sadly, this point is highlighted each year as thousands of children are unintentionally left within parked vehicles by parents or other caregivers after arriving at a destination. These instances have resulted in numerous child deaths caused by the effects of prolonged exposure to extreme temperatures within the parked vehicle. Moreover, even when the child is unhurt, the forgetful caregiver is often arrested by police and charged with child neglect.

Although car seats and other safety devices are commonly utilized to protect children within vehicles, they do nothing to prevent the child from being left behind. Accordingly, there remains a need for a vehicular child alert device capable of reminding vehicle occupants to look for children before exiting the vehicle.

SUMMARY OF THE INVENTION

The present invention is directed to a vehicular child alert device. One embodiment of the present invention can include a main body for housing a pressure switch for indicating the status of a vehicle door, a memory for storing audible notifications, a speaker for playing audible notifications, and a processor for controlling the device.

Another embodiment of the present invention can include one or more visual notification devices capable of providing a visual indication that the vehicle door is in an open position.

Yet another embodiment of the present invention can include an input/output port configured to receive a user customized audible notification for storage in the memory and playback on the speaker.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

FIG. 1 is a simplified block diagram of the vehicular child alert device in accordance with one embodiment of the invention.

FIG. 2 is a top view of the vehicular child alert device in accordance with one embodiment of the invention.

FIG. 3 is a side view of the vehicular child alert device in accordance with one embodiment of the invention.

DETAILED DESCRIPTION OF THE INVENTION

Figure 4:
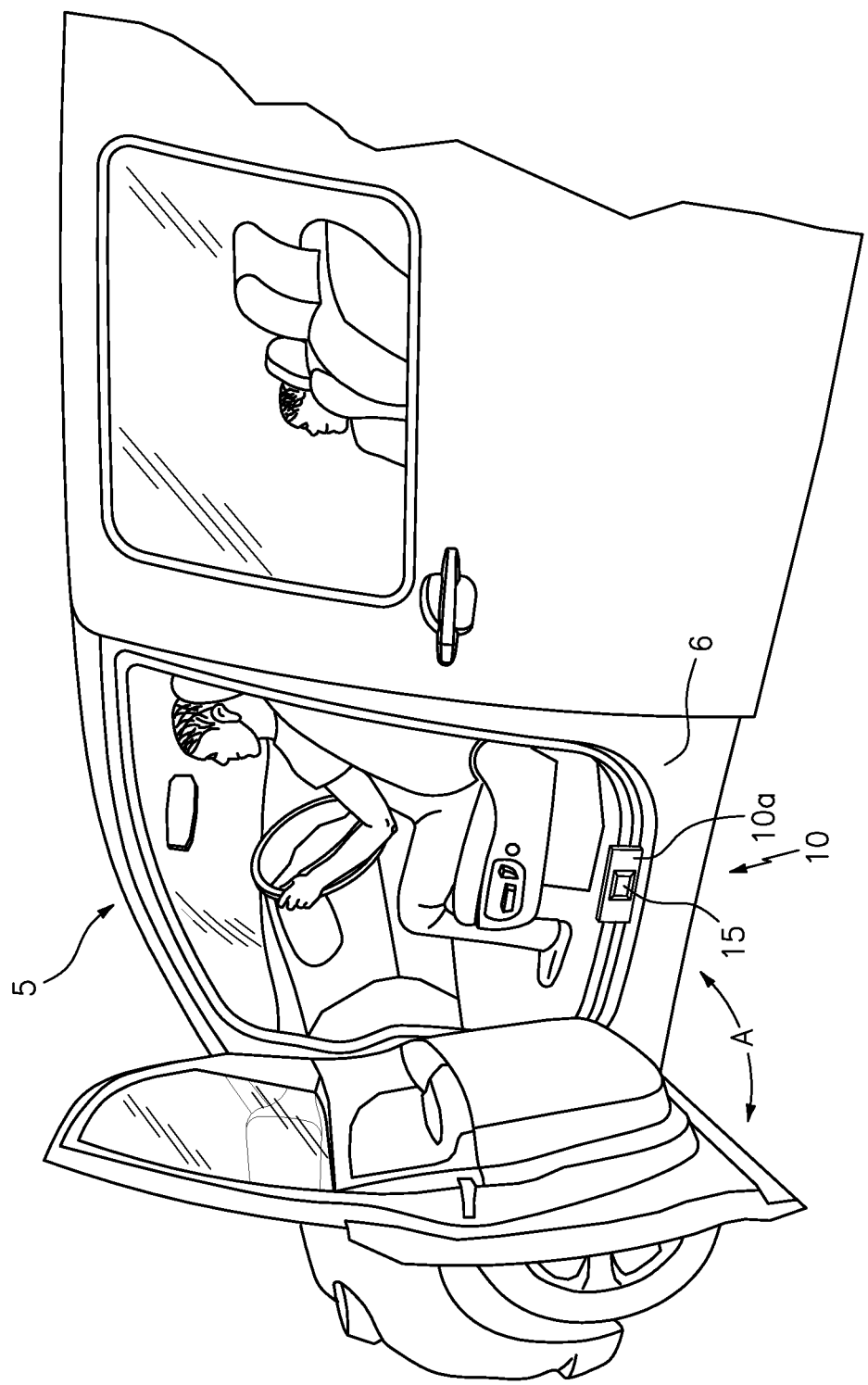
FIG. 4 is a perspective view of the vehicular child alert device in operation, and in accordance with one embodiment of the invention.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Although illustrated as for use within a motor vehicle such as a car, truck or van, the inventive concepts disclosed herein can be utilized in any type of vehicle such as a boat, train, plane, and the like. Moreover, the device can be utilized within home and office environments to remind users of the presence of children (or other precious items) before leaving.

Identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

FIGS. 1-3 illustrate one embodiment of a vehicular child alert device 10 that is useful for understanding the inventive concepts disclosed herein. As shown, the device 10 can include an outer body 10a housing a processor 11 that is connected to an internal memory 12, a speaker 13, a pressure switch 15, a power source 16, and an input/output device 17 via a connection device such as a system bus 20.

The main body 10a can include a plurality of internal connectors/standoffs (not illustrated) for securely positioning each of the elements 11-17 in a conventional manner. In one preferred embodiment, the body 10a can include a thin, hard and impact resistant rectangular shape that is constructed from a mold of injected plastic. Of course, this is for illustrative purposes only, as the main body can take any number of distinct shapes, and can be constructed from any number of construction materials such as metal, PVC and composites, for example, in accordance with known manufacturing processes. To this end, the main body can be constructed to be extremely hard, or can be constructed from a cardboard medium so as to be extremely flexible in nature.

Although illustrated as separate elements, those of skill in the art will recognize that one or more of the components 11-17 can be integrated into one or more printed circuit boards and the interior of the main body can include any number of insulating and/or padded materials 21 such as polyurethane, foam, or styrofoam, for example, to assist the device to withstand the rigors (temperature and vibrations) of extended use within a vehicle, as well as to protect against physical impacts between the pressure switch and the vehicle.

While the dimensions of the elements are not critical, in one preferred embodiment the main body 10a can include a length of approximately 2 inches, a width of approximately 3.5 inches, and a depth of approximately ⅜ inches, so as to allow the device to be portable in nature and to be easily installed in any number of different vehicles without requiring special tools or knowledge. Of course, this is for illustrative purposes only, as the device can include any number of other dimensions and can be constructed so as to be permanently affixed to or within a vehicle at a time of construction.

The processor 11 can act to execute program code stored in the memory 12 in order to allow the device to perform the functionality described herein. Processors are extremely well known in the art, therefore no further description will be provided.

Memory 12 can act to store operating instructions in the form of program code for the processor 11 to execute. Although illustrated in FIG. 1 as a single component, memory 12 can include one or more physical memory devices such as, for example, local memory and/or one or more bulk storage devices. As used herein, local memory can refer to random access memory or other non-persistent memory device(s) generally used during actual execution of program code, and bulk storage devices can be implemented as a persistent data storage device for receiving and audible signals/notifications for the speaker 13 to project.

The memory 12 can also include one or more cache memories that provide temporary storage of at least some program code in order to reduce the number of times program code must be retrieved from the bulk storage device during execution. Each of these devices is well known in the art. As will be described below in detail, the memory 12 can include operating instructions for instructing the processor 11 to activate the speaker 13 and/or visual notifier 14 upon receiving a signal from one or both of the switch 15 and sensor 15a.

The speaker 13 can act to provide any number of audible notifications in order to remind a user that there is a child in the vehicle. The speaker can be controlled by the processor 11 to receive a plurality of notifications that are stored within the memory 12. These notifications can include pre-recorded voice messages such as "warning, baby on board," for example, or repeating sounds such as bells, sirens and the like.

In one embodiment, the device can also include an optional visual notification device 14 capable of providing a visual reminder to the user. In one preferred embodiment, the visual notification device can comprise one or more light emitting diodes (LED), for example, having any number of different colors and luminescent qualities. The visual notification device 14 can also be activated by the processor, and can be configured to blink or remain lit.

The pressure switch 15 can act to notify the processor 11 when the vehicle door has been opened. The pressure switch can be disposed along any surface of the main body 10a so as to protrude outward in order to receive and make contact with the vehicle door. In one embodiment, the pressure switch can be configured to immediately send an electrical signal to the processor when the switch 15 is in an open/non-compressed state (i.e., disengaged). Such a signal being used to indicate that the door is in an open position. Conversely, when the pressure switch is in a closed/compressed state (i.e., engaged), the absence of an electrical signal can indicate that the door is in a closed position. Of course, this arrangement can be reversed depending on the processor instructions.

Although described above as including a pressure switch to indicate the opening of a vehicle door, other embodiments are also contemplated. For example, the notification can be performed via a conventional light and/or motion sensing device such as an electric eye 15a, for example. To this end, upon detecting the movement of the door and/or the illumination from the door mounted light, the device 15a can immediately notify the processor 11.

Pressure switches, motion sensors and electric eyes are extremely well known in the art and typically include the ability to complete and interrupt an electrical signal within a circuit, thereby causing a notification to the processor.

The power source 16 can preferably include one or more DC batteries capable of providing the necessary power requirements to each element of the device 10. In an alternate embodiment (see FIG. 5) the power unit can further include an electrical connector 52 for connecting the device to the vehicle's DC power source. Connector 52 can be provided in conjunction with the one or more DC batteries, or instead of the batteries, to provide power to the device.

The optional input/output device 17 can include any number of options for allowing a user to impart instructions to the device 10. In one preferred embodiment, the I/O device 17 can comprise a micro USB port capable of receiving customized audible notifications created by the user themself. In another embodiment, the input/output device can include a conventional speaker or headphone jack to allow the vehicle speakers to broadcast the audible notification. Of course, any number of other known components can be utilized to accomplish this task.

As shown in FIG. 3, the main body can further include a physical connector 30 for physically securing the device to the vehicle. In one preferred embodiment, the connector 30 can include bonded adhesive strips which can be interposed between the body 10a and the vehicle 5 so as to create a strong bond. However, other connectors capable of securing the device to the vehicle in a removable manner can include strips of hook and loop material (i.e. Velcro®), adhesive tape, magnets and the like. Additional connectors capable of securing the device to the vehicle in a permanent manner can be utilized, these items including permanent bonding agents and compression fittings such as screws, bolts and brackets, for example.

As shown in FIG. 4, the device 10 can be secured to the door frame 6, or the door itself, via the connector 30 at any location suitable for the pressure switch 15 to be engaged and disengaged between the door and the door frame when the door is in a closed and open position, respectively-see arrow A.

In operation, the device can act to quickly and easily notify vehicle occupants of the presence of a child before they exit the vehicle. The process can be initiated when the pressure switch 15 and/or sensor 15a detects that the vehicle door has been opened. Upon detecting that the vehicle door is open, the switch and/or sensor can notify the processor 11, which can then immediately trigger the speaker 13 to emit an audible notification stored within the memory 12.

Figure 5:
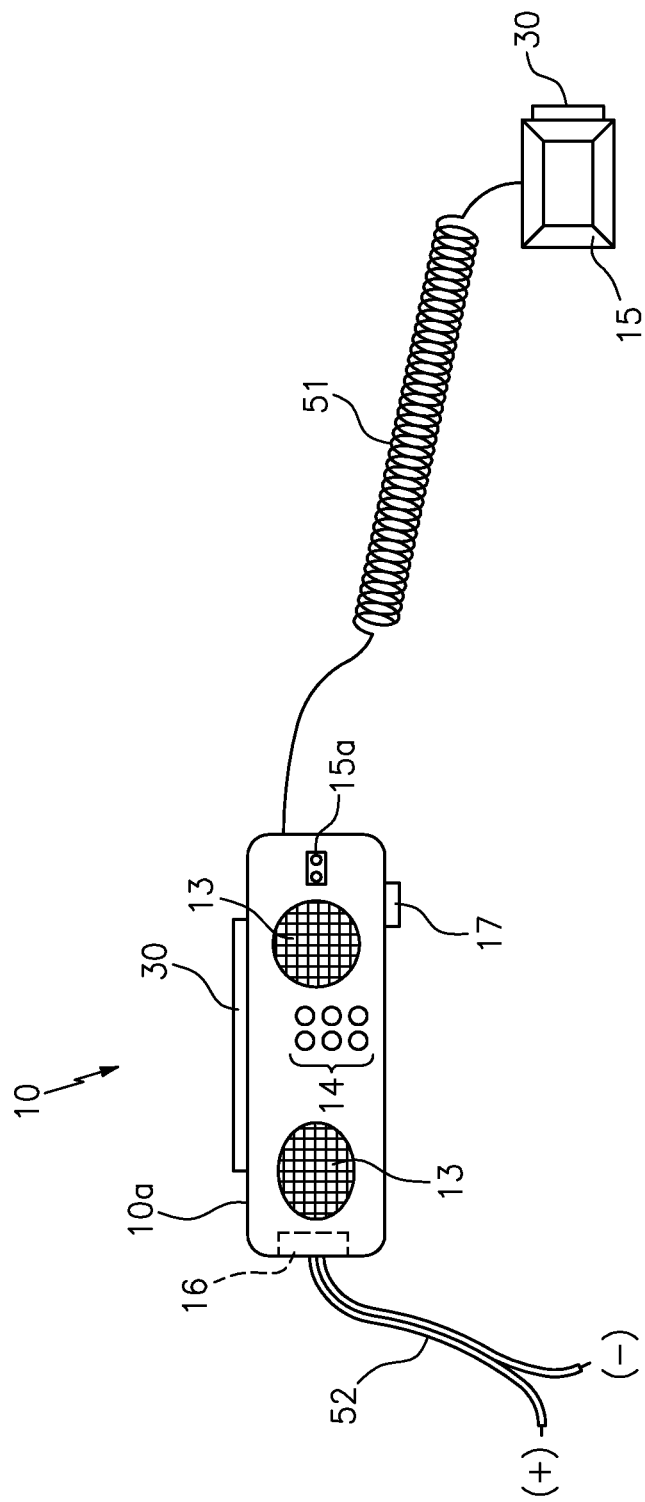
FIG. 5 is a perspective view of the vehicular child alert device in accordance with an alternate embodiment of the invention.
Figure 6:
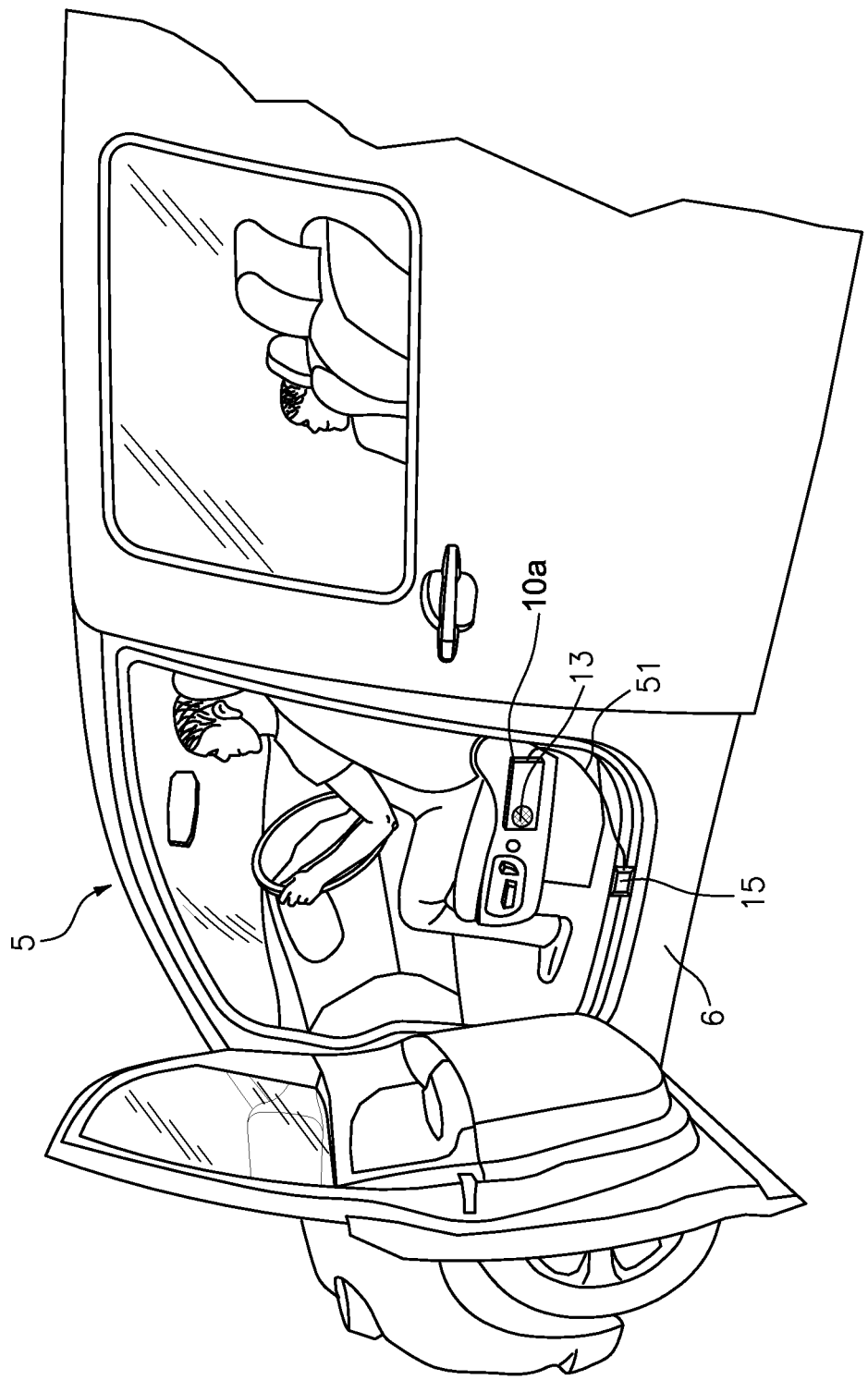
FIG. 6 is a perspective view of the vehicular child alert device in operation, and in accordance with the alternate embodiment of the invention

FIGS. 5 and 6 illustrate an alternate embodiment of the vehicular child alert device 10. As shown, the device 10 can include the main body 10a containing a pair of speakers 13, a plurality of LED's 14, a sensor 15a, an input/output unit 17, and a connector 30, as described above. In this embodiment, the pressure switch 15 is connected to the main body 10a, and the processor 11 via a cable 51, so as to be able to be mounted within the vehicle via a second connector 30 at a location that is different from the main body. Such a feature can act to further protect the delicate electronic components 11-14, 16 and 17 from potential damage caused from repeated impact with the vehicle door.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A vehicular child alert device, consisting of:
   a hardened impact resistant main body having a plurality of sides and an interior space, said main body including a shape and dimension that is suitable for being interposed between a vehicle door and a vehicle door frame;
   an electric eye, having a sensor that is flush mounted along an exterior portion of the main body, said sensor including a motion sensor and/or a light sensor that are configured to detect the vehicle door in an open position;
   a speaker that is secured within the main body;
   one or more light emitting diodes (LED) that is secured within the main body having any number of different colors and luminescent qualities;
   a processor configured to control each of the electric eye, the speaker and the one or more light emitting diodes;
   a first memory configured to store operating instructions for the processor; and
   a second memory configured to store a user supplied audible notification for the speaker,
   wherein the processor is configured to instruct the speaker to play the user supplied audible notification and the one or more light emitting diodes (LED) to provide a visual notification upon receiving a signal from the electric eye.

2. The device of claim 1, further comprising:
   an input/output port configured to receive the user supplied audible notification for storage in the second memory and for playback on the speaker.

3. The device of claim 1, further comprising:
   a speaker jack configured to play the audible notification on a vehicle speaker system.

4. The device of claim 1, further comprising:
   an electrical connector configured to engage a vehicle direct current power source.

5. The device of claim 1, further comprising:
   a direct current power source.

6. The device of claim 1, further comprising:
   a physical connector configured to secure the device to at least one of a vehicle door and a vehicle door frame.

7. The device of claim 1, wherein the memory includes each of a local memory and a bulk storage memory.

8. The device of claim 1, further comprising:
   a padding that is disposed within the main body, said padding being configured to protect the device against damage from vibrations and physical impact.

9. The device of claim 1, further comprising:
   an insulation material that is disposed within the main body, said insulation being configured to protect the device against damage from extreme temperature variations.

* * * * *